(12) United States Patent
Tschirhart et al.

(10) Patent No.: US 10,686,386 B2
(45) Date of Patent: Jun. 16, 2020

(54) ADAPTIVE SYNCHRONOUS RECTIFIER TIMING FOR RESONANT DC/DC CONVERTERS

(71) Applicant: Infineon Technologies Austria AG, Villach (AT)

(72) Inventors: Darryl Tschirhart, Torrance, CA (US); Amir Babazadeh, Laguna Hills, CA (US)

(73) Assignee: Infineon Technologies Austria AG, Villach (AT)

( * ) Notice: Subject to any disclaimer, the term of this patent is extended or adjusted under 35 U.S.C. 154(b) by 288 days.

(21) Appl. No.: 15/364,994

(22) Filed: Nov. 30, 2016

(65) Prior Publication Data

US 2018/0152111 A1 May 31, 2018

(51) Int. Cl.
*H02M 3/335* (2006.01)
*H02M 1/088* (2006.01)
*H02M 1/00* (2006.01)

(52) U.S. Cl.
CPC ....... *H02M 3/33592* (2013.01); *H02M 1/088* (2013.01); *H02M 2001/0009* (2013.01);
(Continued)

(58) Field of Classification Search
CPC .................................................. H02M 3/335
See application file for complete search history.

(56) References Cited

U.S. PATENT DOCUMENTS

2008/0129267 A1 6/2008 Lenz
2010/0182808 A1* 7/2010 Sato ................. H02M 3/33592
363/21.18
(Continued)

FOREIGN PATENT DOCUMENTS

CN 101854126 A 10/2010
WO 2010020913 A1 2/2010

OTHER PUBLICATIONS

"UCD7138 4-A and 6-A Single-Channel Synchronous-Rectifier Driver With Body-Diode Conduction Sensing and Reporting", Texas Instruments, 2015.
(Continued)

*Primary Examiner* — Daniel Kessie
*Assistant Examiner* — Trinh Q Dang
(74) *Attorney, Agent, or Firm* — Murphy, Bilak & Homiller, PLLC

(57) ABSTRACT

A resonant or semi-resonant DC/DC converter makes use of one or more synchronous rectification (SR) switches for rectifying an output current that is provided to a load of the converter. The SR switches are ideally turned off when zero current is flowing through them. To achieve such zero-current switching, the current through each of the SR switches is monitored and compared against a turn-off threshold. The turn-off threshold for a particular SR switch is determined from the slope of a waveform of the current together with a transition delay for turning off the SR switch. This transition delay typically includes a delay through a driver circuit for the SR switch together with a latency through the SR switch itself. Once it is detected that the current for an SR switch has dropped to or below the turn-off threshold, a signal is provided to the SR switch turning it off.

22 Claims, 8 Drawing Sheets

(52) U.S. Cl.
CPC .. *H02M 2001/0058* (2013.01); *Y02B 70/1433* (2013.01); *Y02B 70/1475* (2013.01); *Y02B 70/1491* (2013.01)

(56) References Cited

U.S. PATENT DOCUMENTS

| | | | | |
|---|---|---|---|---|
| 2012/0234160 | A1* | 9/2012 | Khoo | G10H 1/368 |
| | | | | 84/660 |
| 2014/0070780 | A1 | 3/2014 | Yanagida | |
| 2015/0061769 | A1* | 3/2015 | Bodnar | H03G 3/3042 |
| | | | | 330/282 |
| 2015/0333641 | A1* | 11/2015 | Gong | H02M 3/33592 |
| | | | | 363/21.14 |
| 2016/0233768 | A1* | 8/2016 | de Cremoux | H02M 3/157 |
| 2016/0344302 | A1 | 11/2016 | Inoue | |
| 2017/0040883 | A1* | 2/2017 | Hu | H02M 3/156 |
| 2017/0155335 | A1* | 6/2017 | Chang | H02M 1/08 |

OTHER PUBLICATIONS

Amouzandeh, Maryam et al., "Digital Synchronous Rectification Controller for LLC Resonant Converters", IEEE Applied Power Electronics Conference and Exposition (APEC), Mar. 2016, pp. 329-333.

Babazadeh, Amir et al., "Current Sensing and Zero-Cross Detection in Semi-Resonant Voltage Converters", U.S. Appl. No. 15/213,810, filed Jul. 19, 2016.

Babazadeh, Amir, "Method and Apparatus for Phase Alignment in Semi-Resonant Power Converters", U.S. Appl. No. 15/154,520, filed May 13, 2016.

Fei, Chao et al., "Digital Implementation of Adaptive Synchronous Rectifier (SR) Driving Scheme for LLC Resonant Converters", IEEE Applied Power Electronics Conference and Exposition (APEC), Mar. 2016, pp. 322-328.

Tschirhart, Darryl et al., "Performance of ADC for Use in Mixed-Signal Control of Synchronous Rectifiers in Current-Type Resonant Converters", 29th International Telecommunications Energy Conference, INTELEC 2007, pp. 514-521.

Wang, Fan et al., "A Novel Adaptive Synchronous Rectification Method for Digitally Controlled LLC Converters", IEEE Applied Power Electronics Conference and Exposition (APEC), Mar. 2016, pp. 334-338.

Tschirhart, Darryl J., et al., "Mixed Signal Synchronous Rectification Scheme for Current-type Resonant Converters", 2016 IEEE Applied Power Electronics Conference and Exposition (APEC), Mar. 20-24, 2016, 2399-2403.

* cited by examiner

ADAPTIVE SYNCHRONOUS RECTIFIER TIMING FOR RESONANT DC/DC CONVERTERS

TECHNICAL FIELD

The present application relates to resonant and semi-resonant power converters that make use of a synchronous rectification (SR) switch for rectifying an output current and, in particular, relates to techniques for adaptively determining when the SR switch is turned off in order to achieve zero-current switching.

BACKGROUND

Resonant and semi-resonant direct-current (DC) to DC power converters produce alternating currents (AC) internally that must be rectified before power is provided to a load of the power converter. The rectification may be provided by passive techniques that rely upon one or more diodes. Such passive techniques are relatively inefficient due to the voltage drop across the diode(s), and the corresponding power loss. Active rectification techniques make use of power switches, such as field-effect transistors (FETs), and are more efficient than passive techniques due to the reduced impedance of a power switch as compared to a diode. However, the power switches must be actively controlled such that they conduct current only at appropriate times.

When using power switches, henceforth termed synchronous rectification (SR) switches, for rectification, each SR switch should be disabled when the current flowing through it is zero, or as close as feasibly possible to zero. This is termed zero-current switching (ZCS), and results in minimal power loss through the SR switch(es) and a highly efficient power converter. While near-optimal ZCS is reasonably straightforward to achieve under constant-load conditions for a DC/DC power converter, complications arise as the load, and the associated current through the SR switch(es), varies.

Many prior solutions rely upon sensing the voltage across an SR switch and using this voltage to determine when to turn off the SR switch. Such solutions may require extra sensing circuitry (e.g., pins, analog-to-digital converter), as well as extra complexity to account for load variations. In order to account for load variation, some solutions use a voltage threshold that is adapted from one cycle of the DC/DC converter to the next. For example, if a particular voltage threshold leads to the SR switch being disabled after negative current has begun flowing through it for a current cycle of the DC/DC converter, then the voltage threshold is adapted (increased) so that the SR switch is disabled earlier on the next cycle. Conversely, if a particular voltage threshold leads to the SR switch being disabled while positive current is still flowing through it for a current cycle of the DC/DC converter, then the voltage threshold is adapted (decreased) so that the SR switch is disabled later on the next cycle. While such adaptation eventually leads to near-ideal ZCS of the SR switch, such adaptation takes several cycles to reach a steady-state (ideal) switch timing after a load transient. During the adaptation period, the SR switching timing is not ideal and, hence, the power efficiency is reduced.

Accordingly, there is a need for improved techniques for determining when an SR switch should be turned off within a DC/DC power converter. These techniques preferably do not require any additional circuitry beyond that which may already be available within a power converter. Furthermore, these techniques should achieve ZCS of an SR switch across changing load requirements, and the ZCS should persist during a changing load rather than only being re-achieved after some delay following a load transient.

SUMMARY

According to an embodiment of a power converter, the power converter comprises a synchronous rectification (SR) switch for rectifying an output current, and a controller operable to control the conduction of the SR switch. The controller implements this control by sensing a current of the power converter and determining a slope of this current. The controller is further operable to determine a turn-off threshold based upon the current slope and a transition delay of the SR switch. The controller is also operable to detect if the sensed current has decreased to a level that is at or below the turn-off threshold and, responsive to such detection, to turn off the SR switch.

According to an embodiment of a method within a power converter, a current of the power converter is sensed and a slope of the current is determined. A turn-off threshold is determined based upon the slope of the current and a transition delay through a synchronous rectification (SR) switch of the power converter. The sensed current is monitored to detect whether it has decreased to a level that is at or below the turn-off threshold. Responsive to detecting that the current has decreased to such a level, the SR switch is turned off. The power converter within which this method is implemented may be a resonant or semi-resonant DC/DC voltage converter, in which case the current flowing through the SR switch takes on a rectified sinusoidal shape.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

Figure 1:
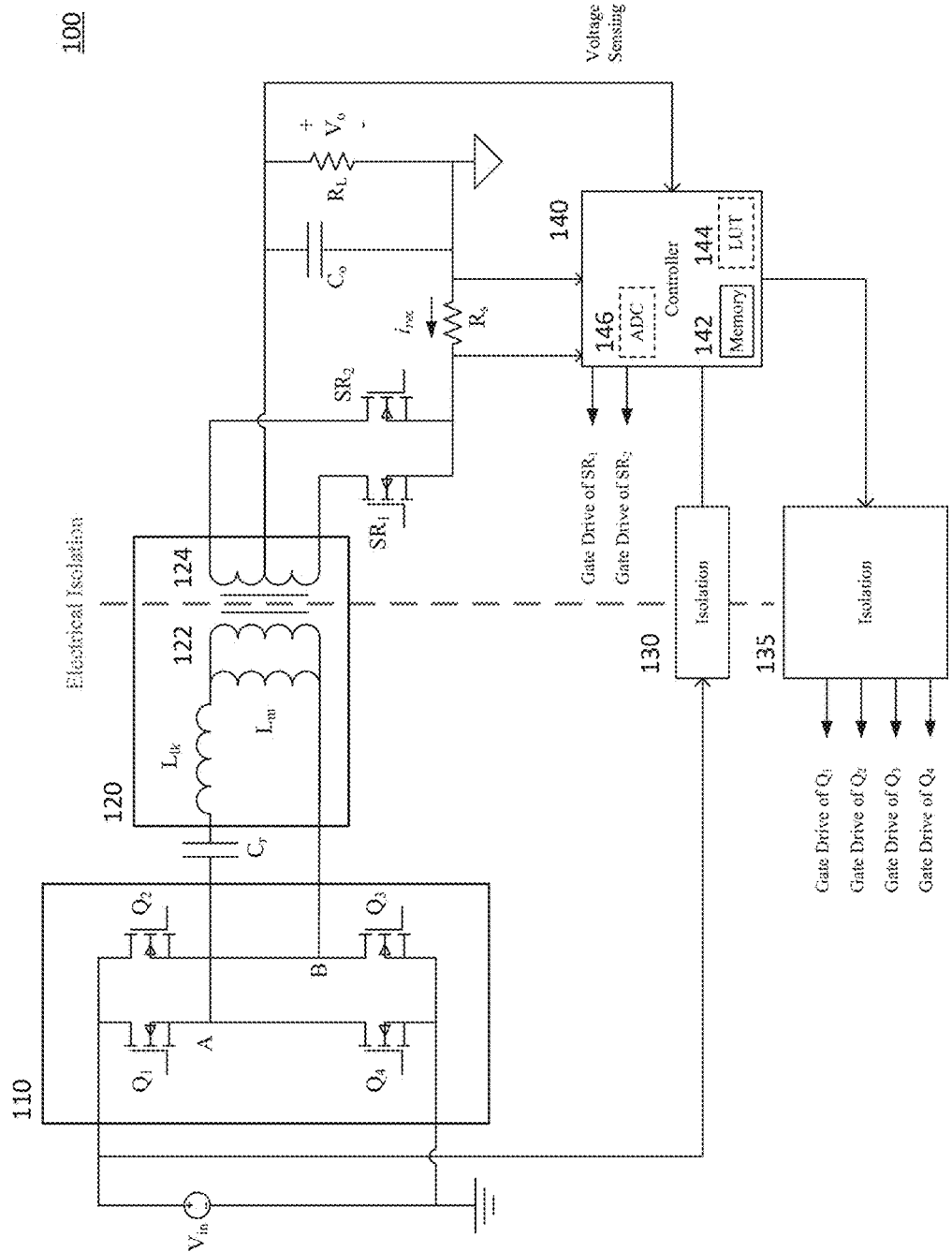
FIG. 1 illustrates a circuit diagram of a resonant power converter that uses synchronous rectification (SR) switches to rectify an output current, and wherein a secondary-side controller adaptively controls the timing of the SR switches.

The embodiments described herein provide techniques for controlling the timing of one or more synchronous rectification (SR) switches that are used to rectify current provided to a load of a DC/DC power converter. In several of these embodiments, a controller of the DC/DC power converter is configured to sense a current flowing through an SR switch and to determine a slope for this current. The controller further determines a transition delay that accounts for the time period from an instant in time when the controller signals the SR switch to turn off until an instant in time when the SR switch actually stops conducting current. The controller determines a turn-off threshold, corresponding to a current through the SR switch, based upon the slope of the current and the transition delay. If the controller detects that the current of the SR switch drops to this turn-off threshold or below, then the controller turns off the SR switch.

Note that the techniques of several of the embodiments herein do not require the measurement of a voltage across the SR switch. While these techniques make use of a current through the SR switch, such current information is often already available at the controller of a DC/DC converter. More specifically, the SR current is typically input to the controller for purposes of controlling the output power, e.g., setting a frequency of the power converter in order to ensure the proper power is supplied to a load of the power converter. Note that techniques for setting such a frequency and controlling the output power of a power converter are well-known in the art and will not be described herein, in order to avoid obfuscating the unique aspects of this invention.

Because the SR switch current is already available at the controller of the DC/DC power converter, no additional pins or related circuitry are necessarily required to implement the invention. This presents an advantage over prior solutions that use the voltage across the SR switch and, hence, may require additional circuitry (e.g., controller pins) in order to sense this voltage.

Additionally, techniques described herein make use of the current and the slope of the current for the SR switch in a present cycle of the DC/DC power converter in order to determine a turn-off time of the SR switch for the present cycle. Accordingly, zero-current switching (ZCS) of the SR switch may be achieved immediately for each cycle of the DC/DC power converter even under varying loads, e.g., after load transients. Stated alternatively, there is no time lag in achieving ZCS after a load transient, as is inherent in prior adaptive techniques that use a voltage error for a present cycle to adjust (improve) the turn-off timing for future cycle(s) of the DC/DC power converter.

Resonant DC/DC LLC Power Converter using Current Sense Resistor

An embodiment of the invention will now be described using the power converter illustrated in FIG. 1. This power converter is a resonant DC/DC voltage converter arranged in an LLC configuration, wherein sinusoidally-shaped currents are produced on the secondary winding of a transformer. It should be noted that the invention is not limited to resonant DC/DC voltage converters or LLC configurations, but may be implemented in other power converters having an SR switch for rectification, and through which a current and a slope thereof may be determined.

FIG. 1 illustrates a resonant DC/DC power converter 100 having a transformer 120 and isolation circuits 130, 135 that provide electrical isolation between primary and secondary sides of the power converter 100. The primary side includes a power stage 110 that, as shown, includes four power switches $Q_1$, $Q_2$, $Q_3$, $Q_4$ configured in a full-bridge orientation. In typical implementations, each of the power switches $Q_1$, $Q_2$, $Q_3$, $Q_4$ has a driver at its control input, e.g., gate terminal. (For ease of illustration, such drivers are not shown.) The power switches $Q_1$, $Q_2$, $Q_3$, $Q_4$ illustrated in FIG. 1 are enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. A source $V_{IN}$ provides power to the power stage 110 which, in turn, provides power to the primary side of the transformer 120 via a resonant capacitor $C_r$.

The transformer 120 is modeled as having a leakage inductance $L_{lk}$, and a magnetizing inductance $L_m$, in addition to a primary winding 122 and secondary winding 124. The parasitic inductances $L_{lk}$, $L_m$ of the transformer 120, together with the resonant capacitor $C_r$, form a resonant tank that serves to generate a sinusoidally-shaped current across the primary winding 122. This, in turn, induces a sinusoidally-shaped current across the secondary winding 124.

The secondary winding 124 is a center-tapped winding wherein the center tap is coupled to an output load that is modeled using a load resistor $R_L$. This load resistor $R_L$ should be considered variable, to properly model the varying load of the power converter 100. An output voltage $V_O$ is provided across the load resistor $R_L$, and is filtered by an output capacitor $C_O$. The secondary winding 124 is also coupled to SR switches $SR_1$, $SR_2$, which rectify the output current provided to the load resistor $R_L$. A sense resistor $R_S$ is interposed between the SR switches $SR_1$, $SR_2$ and ground. The voltages on either side of the sense resistor $R_S$ are provided to a controller 140, so that the controller 140 can sense the voltage across the sense resistor $R_S$ and determine the current flow $i_{rec}$ through the SR switches $SR_1$, $SR_2$. Note that this current flow $i_{rec}$, in conjunction with the output voltage $V_O$ which is also provided to the controller 140, is used by the controller 140 to control the amount of power provided to the load $R_L$. As will be explained below, this current $i_{rec}$ is also used to determine the turn-off timing for the SR switches $SR_1$, $SR_2$.

The controller 140 controls the power switches $Q_1$, $Q_2$, $Q_3$, $Q_4$ of the power stage 110 and the SR switches $SR_1$, $SR_2$. In addition to its use of the output current and output voltage $V_O$, the controller 140 may sense the input voltage $V_{IN}$, via isolation circuit 130, and use this voltage in its control of the output power (e.g., setting of a switching frequency). The controller 140 generates control signals that are provided to the power switches $Q_1$, $Q_2$, $Q_3$, $Q_4$ using isolation circuit 135.

Figure 2:
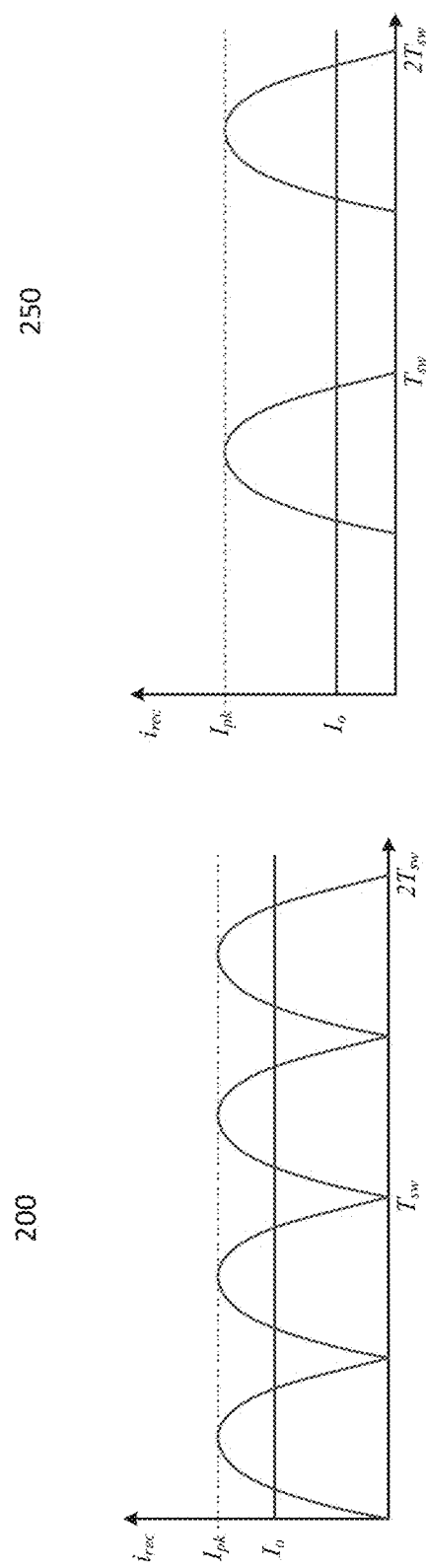
FIG. 2 illustrates waveforms corresponding to the current flowing through SR switch(es) within a resonant and a semi-resonant power converter, respectively.

FIG. 2 illustrates a waveform 200 for the current $i_{rec}(t)$ through the SR switches $SR_1$, $SR_2$. This waveform 200 represents a rectified sinusoid having a switch period $T_{SW}$. While the switch period $T_{SW}$ and peak current $I_{pk}$ are illustrated for a constant switch frequency $f_{SW}$, the switch frequency $f_{SW}$ and peak current $I_{pk}$ will vary as the load requirements of the power converter 100 vary. During conduction intervals of the SR switches $SR_1$, $SR_2$, the rectified current is given by:

$$i_{rec}(t) = |I_{pk} \sin(\omega_o t)| \quad (1)$$

and the peak current $I_{pk}$ is related to the average output current $I_O$ as:

$$I_{pk} = \frac{\pi}{2} I_O. \quad (2)$$

The peak current $I_{pk}$ varies with load, which means the derivative of the rectified current $i_{rec}(t)$ also varies with load. This, in turn, means that the optimal SR switch timing, i.e., to achieve ZCS, is load dependent. A fixed current threshold could be set for determining when the SR switches $SR_1$, $SR_2$ should be turned off in order to achieve ZCS. However, such a current threshold would be optimal for one load condition, and will be sub-optimal for other load conditions unless the threshold is adapted. One technique for adaptively determining the current threshold is to make use of the derivative of the current through the SR switches $SR_1$, $SR_2$, or some variant of this current.

Figure 3:
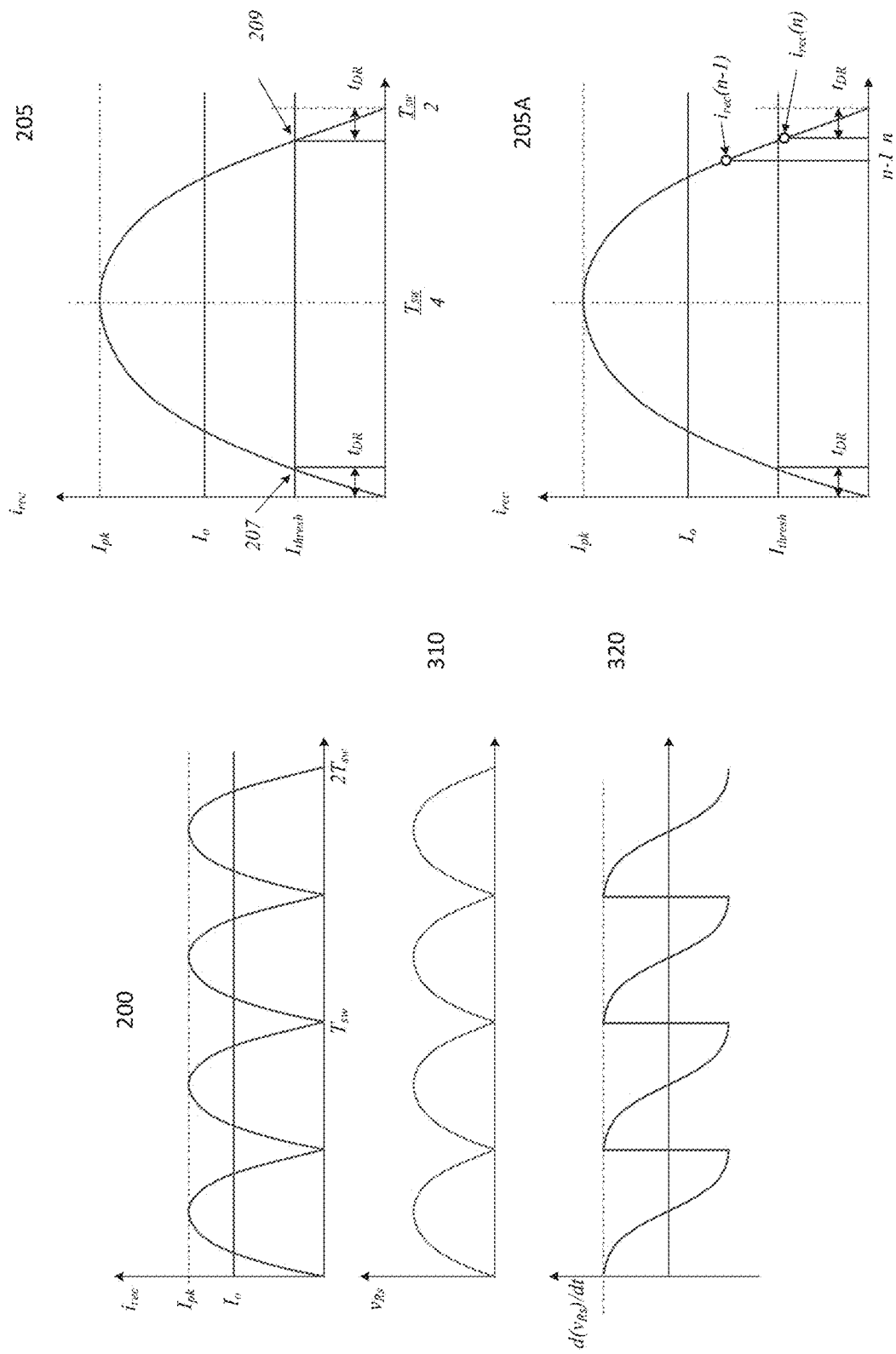
FIG. 3 illustrates waveforms corresponding to a current flowing through SR switches within a resonant power converter, a voltage across a sense resistor configured in series with the SR switches, and the derivative of this voltage.

FIG. 3 illustrates waveforms 200, 205, 205A, 310, 320 associated with the current through the SR switches $SR_1$, $SR_2$ and the sense resistor $R_s$ coupled to these switches. The top and right waveforms 200, 205, 205A represents the rectified current $i_{rec}(t)$, as previously illustrated in FIG. 2. The middle waveform 310 illustrates the voltage $V_{Rs}$ across the sense resistor $R_s$, which is linearly related to the rectified current $i_{rec}(t)$. The bottom waveform 320 illustrates the derivative $d(v_{Rs})/dt$ of the voltage across the sense resistor $R_s$. The voltage derivative $d(v_{Rs})/dt$ may be readily converted into the slope (first derivative) of the current $i_{rec}(t)$ using Ohm's law and the resistance of the sense resistor $R_s$.

Determination of Slope of the Current using Piecewise Linear Approximation

In a first sub-embodiment, the controller 140 senses the rectified current $i_{rec}(t)$ by measuring the voltage $V_{Rs}$ across the sense resistor $R_s$ and converting this voltage $V_{Rs}$ into the current $i_{rec}(t)$. The voltage $V_{Rs}$ may be periodically sampled, e.g., using an analog-to-digital converter (ADC) 146 in the controller 140, so that values $i_{rec}(n)$ for the current $i_{rec}(t)$ may be periodically acquired. One technique for determining the slope of the current $i_{rec}(t)$ is to take the difference between two such current samples, and divide this current difference by the time delta between when the two samples were taken. This yields a good approximation for the slope, henceforth denoted $m_1$, of the current waveform, at least when the sampling rate is relatively high.

Figures 8, 9:
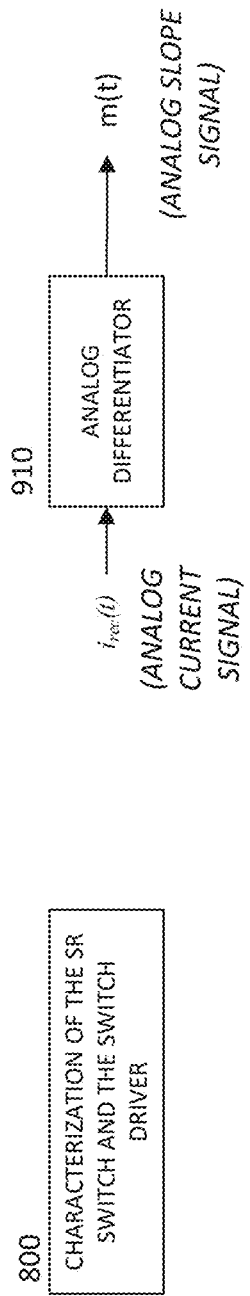
FIG. 8 illustrates a characterization of time delays.
FIG. 9 illustrates an analog differentiator.

The controller 140 provides signals to the SR switches $SR_1$, $SR_2$ in order to control when they conduct. For the illustrated MOSFET switches $SR_1$, $SR_2$ of FIG. 1, the switches are each controlled using a gate terminal of the respective switch. Typically, a driver is interposed between each output control signal provided by the controller 140 and the gate terminal of the corresponding SR switch $SR_1$, $SR_2$. For ease of illustration, such drivers are not shown in FIG. 1. There is a transition delay between the time instant when the controller 140 signals one of the SR switches $SR_1$, $SR_2$ to turn off and the time instant when the corresponding SR switch actually ceases to conduct current. This transition delay, henceforth denoted $t_{DR}$, includes the delay time through the driver and any incurred SR switch delay. The transition delay $t_{DR}$ is characterized by the timing of a particular SR switch and its driver, and may vary from one switch/driver component set to the next. Hence, the transition delay $t_{DR}$ will typically be determined during a characterization 800, as shown in FIG. 8, or calibration phase of the power converter 100, or the underlying switch/driver components therein, and the characterized transition delay $t_{DR}$ will be stored in a memory 142 of the controller 140 so that it may be used during subsequent operational phases of the power converter 100. Note that this transition delay $t_{DR}$ is fixed and does not vary as the load of the power converter 100 varies. However, the transition delay $t_{DR}$ may be compensated for temperature during operation of the power converter 100, as this delay may be temperature dependent.

With the slope $m_1$ of the current $i_{rec}(t)$ determined for a time sample n, and the transition delay $t_{DR}$ known, a current threshold at time sample n may be calculated as follows:

$$i_{thresh}(n) = t_{DR} |m_1(n)|. \quad (3)$$

As explained above, the current slope $m_1$ may be calculated based upon two current samples, e.g., as follows:

$$m_1(n) = \frac{i_{rec}(n) - i_{rec}(n-1)}{\Delta t} \quad (4)$$

where $\Delta t$ is the time difference between samples $i_{rec}(n)$ of the current $i_{rec}(t)$.

Equations (3) and (4) may thus be used to determine a current threshold $i_{thresh}$ at a given time n, according to:

$$i_{thresh}(n) = t_{DR} \left| \frac{i_{rec}(n) - i_{rec}(n-1)}{\Delta t} \right| \quad (5)$$

Exemplary current values $i_{rec}(n)$, $i_{rec}(n-1)$ corresponding to time samples n and n−1 are shown in waveform 205A of FIG. 3. If the controller 140 detects, at a time sample n, that the sampled current $i_{rec}(n)$ is equal to or has fallen below the threshold $i_{thresh}(n)$, then the controller 140 sends a turn-off signal to whichever SR switch $SR_1$, $SR_2$ is currently conducting. Such an SR switch will then stop conducting current at a time that is $t_{DR}$ after the instant when the controller 140 set this signal, and the instant in time when the SR switch current conduction actually ceases will be when no current (or substantively no current) is flowing through the SR switch.

The above description is provided in the context of sampled currents and the slope of such currents, wherein the currents are based upon measured voltages. One skilled in the art will recognize that it is not necessary to actually translate the voltage $V_{Rs}$ measured across the sense resistor $R_s$ into a current per se. Because the voltage $V_{Rs}$ is linearly related to the current $i_{rec}(t)$, the voltage $V_{Rs}$ and a slope thereof may be used directly (i.e., without actually translating this voltage into current) in order to achieve the equivalent results. Such direct usage of the voltage and voltage slope provides an implementation that is computationally simpler in many cases, but which is functionally equivalent to using current and current slope.

The above description is also provided in the context of a controller 140 that utilizes digital techniques, and that uses digital samples of the voltage $V_{Rs}$ that are periodically taken. In alternative embodiments, analog techniques and circuits may be used. For example, an analog comparator may be used to compare the SR switch current (or a corresponding voltage) against a current threshold (or a corresponding voltage threshold). This has the potential advantage of providing more precise timing for the turn-off instant of an SR switch, because the current comparison is not limited to discretely-sampled points in time as in a fully digital implementation. However, this has the disadvantage of requiring additional circuitry. As another example, the current slope (or a corresponding voltage slope) may be determined using an analog differentiator circuit 910, as illustrated in FIG. 9, rather than being based upon periodically sampled voltages or currents.

The controller 140 and its constituent parts may be implemented using a combination of analog hardware components (such as transistors, amplifiers, diodes, resistors, analog-to-digital converters), and processor circuitry that includes primarily digital components. The processor circuitry may include one or more of a digital signal processor (DSP), a general-purpose processor, and an application-specific integrated circuit (ASIC). The controller 140 may also include memory, e.g., non-volatile memory such as flash, that includes instructions or data for use by the processor circuitry, and one or more timers. The controller 140 inputs sensor signals such as signals corresponding to the current through the SR switches $SR_1$, $SR_2$.

Determination of Slope of the Current using Higher-Accuracy Approximation

The techniques described above make use of a piecewise linear approximation for the slope of the current $i_{rec}(t)$ through the SR switches $SR_1$, $SR_2$. These approximations are reasonably accurate when the portion of the waveform of interest is nearly linear, and/or when the current $i_{rec}(t)$ is sampled frequently. Furthermore, these techniques may be readily applied to current waveforms that are not sinusoidal, provided that such current waveforms are differentiable. The slope approximations may be improved by making use of the formula for a current waveform. Such improved approximations are described below for a sinusoidal current waveform, as produced by a resonant power converter 100 as shown in FIG. 1.

The rectified current through an SR switch is given by:

$$i_{rec}(t) = |I_{pk} \sin(\omega_o t)|. \qquad (6)$$

During periods when the SR switch is conducting, the derivative (slope) of this current $i_{rec}(t)$ is given by:

$$\frac{d}{dt} i_{rec}(t) = \qquad (7a)$$

$$\begin{cases} I_{pk}\omega_o\cos(\omega_o t), \text{ for } 0 \le t < \frac{T_{SW}}{4}, \frac{T_{SW}}{2} \le t < \frac{3T_{SW}}{4}, \text{ etc.} \\ -I_{pk}\omega_o\cos(\omega_o t), \text{ for } \frac{T_{SW}}{4} \le t < \frac{T_{SW}}{2}, \frac{3T_{SW}}{4} \le t < T_{SW}, \text{ etc.} \end{cases}$$

wherein $T_{SW}$ is the switching period.

The shape of the waveform given by equation (7a) can be seen in the voltage derivative waveform 320 of FIG. 3, which is linearly related to the current derivative given by equation (7a). In order to simplify the following explanations, only the magnitude of the slope (derivative) from equation (7a) will be considered henceforth:

$$\left|\frac{d}{dt} i_{rec}(t)\right| = |I_{pk}\omega_o\cos(\omega_o t)|. \qquad (7b)$$

Note that the derivative in equation (7b) corresponds to the slope given by equation (4) for the piecewise linear approximation. The desired current threshold $i_{thresh}(t)$ may be calculated as:

$$i_{thresh}(t) = |I_{pk}\sin(\omega_o t)| = t_{DR}|I_{pk}\omega_o\cos(\omega_o t)|. \qquad (8)$$

FIG. 3 illustrates a waveform 205 for one half cycle of the current $i_{rec}(t)$. Whereas the current threshold $I_{THRESH}$ is actually used on the decreasing slope 209 of the waveform, the sinusoidal half cycle is symmetric about $$t = \frac{T_{SW}}{4},$$

and hence the threshold may be calculated on the rising slope 207 of the waveform. On the rising slope 207, both the sine and cosine functions are positive and the magnitude operations of equation (8) may be ignored. The time instant for the current threshold, denoted as $t_{thresh}$ may then be derived from equation (8) as follows:

$$t_{DR}\omega_o = \frac{\sin(\omega_o t_{thresh})}{\cos(\omega_o t_{thresh})} = \tan(\omega_o t_{thresh}) \qquad (9)$$

$$\omega_o t_{thresh} = \arctan(\omega_o t_{DR}) \qquad (10)$$

$$t_{thresh} = \frac{1}{\omega_o}\arctan(\omega_o t_{DR}) \qquad (11)$$

where $\omega_o = 2\pi f_{SW} = \frac{2\pi}{T_{SW}}$.

The derived time instant $t_{thresh}$ could be used directly for turning off an SR switch. In preferred embodiments, direct use of only the time $t_{thresh}$ is not desired for practical considerations. For example, the waveform for the current $i_{rec}(t)$ may not be comprised of perfect sinusoidal half cycles, will have some unpredictable noise component, may be slightly delayed/advanced relative to its ideal timing, etc. Hence, in a preferred embodiment, the time threshold $t_{thresh}$ is used to determine a more accurate current threshold as compared with the previously-described techniques that rely upon a piecewise linear approximation of the slope of the current.

With the time threshold $t_{thresh}$ derived as above, the current threshold may then be calculated using equation (8) as follows:

$$i_{thresh}(t = t_{thresh}) = I_{pk}\sin(\omega_o t_{thresh}) \qquad (12)$$

$$= I_{pk}\sin\left(\omega_o \frac{1}{\omega_o}\arctan(\omega_o t_{DR})\right) \qquad (13)$$

$$= I_{pk}\sin\left(\arctan\left(2\pi\frac{t_{DR}}{T_{SW}}\right)\right) \qquad (14)$$

For small values of the ratio $$\frac{t_{DR}}{T_{SW}}$$

the sine and tangent functions are approximately equal. (For example, this approximation is very good for $$\frac{t_{DR}}{T_{SW}} < 0.1$$

and excellent for $$\frac{t_{DR}}{T_{SW}} < 0.05.\bigg)$$

Using this approximate equivalency, the arc tan of equation (14) may be replaced with an arc sin leading to:

$$i_{thresh} = I_{pk}\left(\frac{t_{DR}}{T_{SW}}\right) \qquad (15)$$

The switch period $T_{SW}$ and transition time $t_{DR}$ are known by the controller 140, but the peak current $I_{pk}$ must be determined. In one sub-embodiment, the controller 140 monitors the current $i_{rec}(t)$ through the SW switches $SR_1$, $SR_2$ and captures the peak current $I_{pk}$ during each half-cycle of the power converter 100. For example, the controller 140 may sample the current and save the sampled current whenever it is larger than some previously-saved current. In another sub-embodiment, the controller 140 may use the slope of the sensed current $i_{rec}(t)$ to find the peak current $I_{pk}$. More particularly, the controller 140 may detect that the slope of the current $I_{rec}(t)$ is zero and, at this instant, save the current $i_{rec}(t)$ as the peak current $I_{pk}$. In yet another embodiment, an analog peak detection circuit may capture the peak current $I_{pk}$ and provide it to the controller 140 for each half cycle of the power converter 100.

As an alternative to determining the peak current $I_{pk}$, an average $I_O$ of the rectified current $i_{rec}(t)$ may be used instead. This may be advantageous in some implementations, as the controller 140 may already maintain a value for the average current $I_O$ for other purposes. The peak and average currents for a resonant converter are related as $$I_{pk} = \frac{\pi}{2} I_O.$$

Techniques for Using a Look-Up Table when Determining Thresholds

The above-described techniques calculate a turn-off threshold, e.g., $I_{thresh}$, based upon a current slope (derivative) and transition time $t_{DR}$. As an alternative to such calculation, the turn-off threshold may be determined using a look-up table (LUT) 144. Techniques based upon a LUT have the advantage that calculations may be avoided, but this comes at the expense of requiring memory for the LUT. While an LUT may be used with the piecewise linear approximation of slope, the use of an LUT is more advantageous when using more accurate techniques, such as those based upon equations (7) through (14). Note that the approximations used in deriving equation (15) from equation (14) need not be made when using LUTs. Hence, an LUT may provide more accurate turn-off thresholds than are provided by equation (15).

In a first LUT-based technique, a peak current $I_{pk}$ would be determined using the techniques described above. The peak current $I_{pk}$, which is directly related to the slope (derivative) of the current, is used to address the LUT, which then produces a turn-off threshold $I_{thresh}$, or its equivalent (e.g., an associated voltage threshold). The LUT may also input the switching period $T_{SW}$, or an equivalent parameter such as switch frequency $f_{SW}$. In a second LUT-based technique, an average current $I_O$ would be used to address the LUT rather than the peak current $I_{pk}$.

Half-Wave Resonant, Semi-Resonant and Other Power Converter Topologies

While FIG. 1 illustrates a full-wave resonant LLC DC/DC power converter 100, it should be recognized that other power converter topologies may also make use of the techniques described herein. Of particular note, the techniques are readily extrapolated for use within half-wave resonant and semi-resonant power converters. Half-wave resonant power converters have the advantage that the rectification may be accomplished with one SR switch, but tend to be noisier and/or require additional filtering compared with full-wave rectification, as performed by the power converter 100 of FIG. 1. Unlike the power converter 100 of FIG. 1, semi-resonant power converters typically use a center-tapped transformer/inductor and, thus, are not an isolated topology. Semi-resonant power converters also typically include only a single SR switch, as opposed to the two SR switches $SR_1$, $SR_2$ that are included for the full-wave rectification in the power converter 100 of FIG. 1. Like the resonant DC/DC power converter of FIG. 1, half-wave resonant and semi-resonant power converters also produce current waveforms that take on the shape of half-cycles from a sinusoid. A current waveform 250 as may be produced within a half-wave resonant or semi-resonant power converter is shown in FIG. 2.

In addition to resonant and semi-resonant converters, the techniques may also be applied to other types of power converters, provided that a slope of the waveform for a current through an SR switch may be determined. Stated alternatively, it must be possible to take a derivative of such a current waveform.

Alternate Techniques for Sensing Current

The resonant power converter 100 of FIG. 1 makes use of a sense resistor $R_s$ for determining the current through the SR switches $SR_1$, $SR_2$. This technique is preferred in many embodiments, as the sense resistor $R_s$ and its use for determining current through the SR switches $SR_1$, $SR_2$ may already be available for other purposes, e.g., controlling the power supplied to the load. However, it should be recognized that other techniques for sensing current through SR switches $SR_1$, $SR_2$ are possible, and may be preferred in some implementations.

Figure 4B:
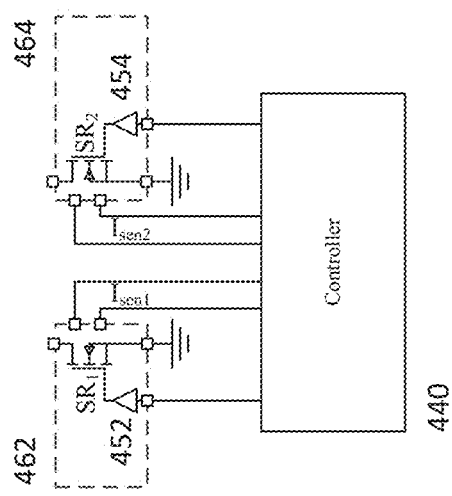
FIG. 4B illustrates a circuit wherein the controller uses current-sensing circuitry integrated within the SR switches.
Figure 4A:
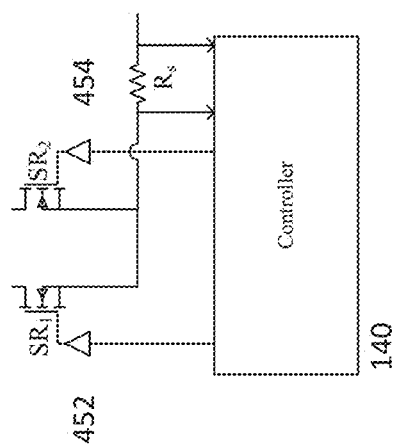
FIG. 4A illustrates a circuit diagram wherein a controller senses the current through SR switches using a sense resistor.

FIG. 4A illustrates a controller 140 that makes use of a sense resistor $R_s$, as may be included in a power converter 100 as illustrated in FIG. 1. Note that the sense resistor $R_s$ need not be a discrete resistor, but could be, e.g., the parasitic resistance of a copper trace. Also illustrated in FIG. 4A are SR switches $SR_1$, $SR_2$ and their corresponding drivers 452, 454. Alternative embodiments may sense the current through the SR switches $SR_1$, $SR_2$ without requiring a sense resistor.

Figure 5:
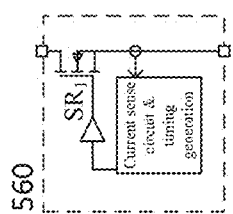
FIG. 5 illustrates a circuit diagram for a smart SR switch circuit, in which the timing control for turning off the SR switch is integrated within the smart SR switch circuit, rather than being performed by a main controller of a power converter.

FIG. 4B illustrates current sensing techniques that are integrated within the SR switches $SR_1$, $SR_2$. For example, current mirrors may be integrated within or otherwise coupled to the SR switches $SR_1$, $SR_2$ and provide current measurements to a controller 440. For another example, a voltage $V_{DS}$ (not shown for ease of illustration) may be measured across the drain and source terminals of the SR switches $SR_1$, $SR_2$, and converted to a current estimate using a characteristic on-resistance $R_{DS\_ON}$ of the corresponding SR switch $SR_1$, $SR_2$. While the sense outputs from the SR switch circuits 462, 464 are shown as each being doubled-ended, they could also be single-ended Integration of SR Switch Control into SR Switch Circuit In the power converter 100 illustrated in FIG. 1 and described in the above embodiments, the controller 140, 440 senses the current through the SR switches $SR_1$, $SR_2$ and determines the timing for these switches. In an alternative embodiment, a smart SR switch circuit could sense its own current and determine its turn-off timing, using the techniques as described above. Such a smart SR switch circuit 560 is illustrated in FIG. 5.

Use of the smart SR switch circuit 560 has advantages over the previously-described techniques in that the main controller 140, 440 could be offloaded of the computational tasks required for determining when to turn off an SR switch. Furthermore, the timing (e.g., a transition delay including a driver delay and SR switch latency as described previously) of each smart SR switch circuit 560 could be characterized and stored within the smart SR switch circuit. Such smart SR switch circuits could be readily integrated into a power converter without the need to characterize/calibrate the power converter to account for the timings associated with individual driver or SR switch components. The smart SR switch circuits may have enable signals that are controlled from a main controller, such as the controller 140 in the power converter 100 of FIG. 1. The signal to turn on the SR switch $SR_1$ of the smart SR switch circuit 560 could be provide by an external controller, such as the controller 140, or could be self-generated.

Use of Primary-Side Current for Determining Turn-Off Threshold

The resonant LLC power converter 100 of FIG. 1 included a controller 140 located on the secondary side of the transformer 120. A resonant LLC power converter may instead be configured to include a controller on its primary side, as shown in the power converter 600 illustrated in FIG. 6. For this power converter 600, it may not be feasible and/or preferred to directly sense the current flowing through the SR switches $SR_1$, $SR_2$. However, currents flowing on the primary side may be sensed and used to determine a turn-off threshold for the SR switches $SR_1$, $SR_2$ on the secondary side of the power converter 600.

Figure 6:
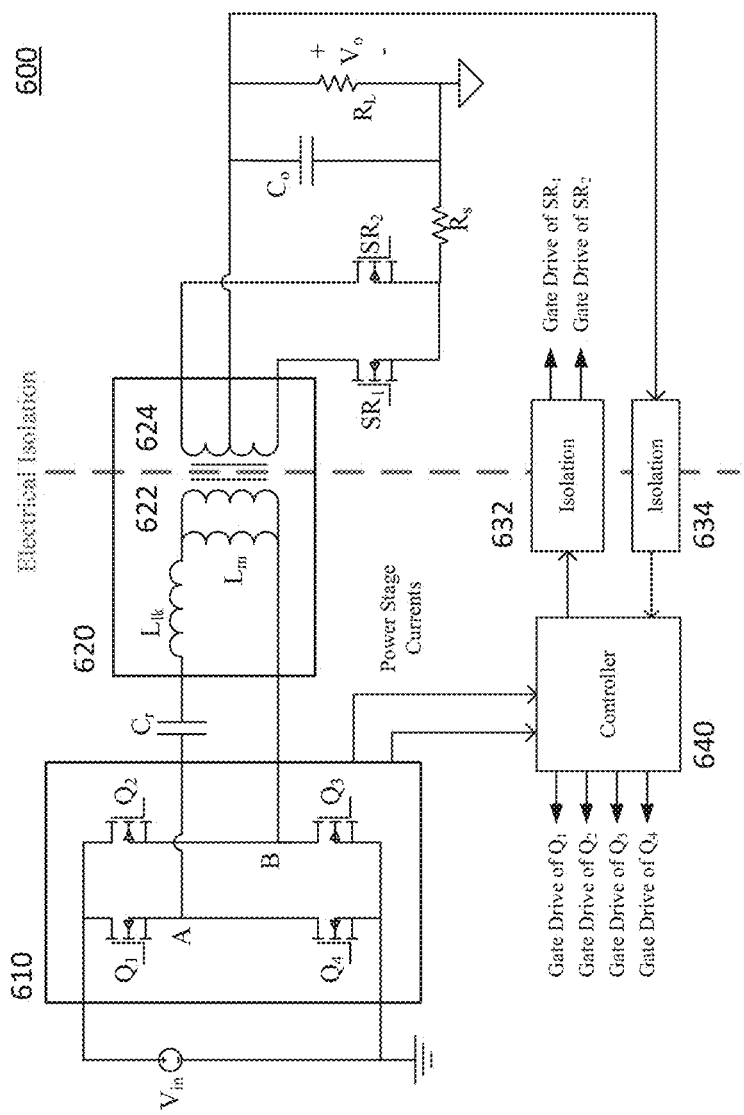
FIG. 6 illustrates a circuit diagram for a resonant power converter similar to that of FIG. 1, except that the controller is located on a primary side of the power converter and currents on the primary side are used to determine when to turn off the SR switches on the secondary side.

The power converter 600 of FIG. 6 is similar to the power converter 100 of FIG. 1, and only those components that are substantively different will be described below. The controller 640 is located on the primary side of the power converter 600. The controller 640 uses an isolation circuit 634 to sense the output voltage $V_O$ across the load $R_L$. The controller 640 uses this output voltage $V_O$ to ensure that the power converter 600 provides adequate power to the load $R_L$. As in the power converter 100 of FIG. 1, the controller 640 generates signals to control the SR switches $SR_1$, $SR_2$. However, these signals must be passed to the secondary side of the power converter 600 using an isolation circuit 632.

The controller 640 senses currents of the power stage 610. The sensing may be accomplished using the same techniques as described for sensing the currents directly through the SR switches $SR_1$, $SR_2$. For example, a sense resistor in series with the power switches $Q_3$ and $Q_4$ may be used, a current mirror coupled to or integrated with the power switches $Q_3$ and $Q_4$ may be used, or the voltage across the power switches $Q_3$ and $Q_4$ together with their characteristic on-resistances $R_{DS\_ON}$ may be used.

The controller 640 determines the slope of a primary-side current. This slope, together with a primary-to-secondary transition delay, is used to determine a turn-off threshold in a manner similar to that described regarding the power converter 100. In addition to accounting for the delay through a driver of an SR switch $SR_1$, $SR_2$ and the delay of the SR switch $SR_1$, $SR_2$ itself, the primary-to-secondary transition delay also accounts for the latency in the power transfer across the transformer 620 as well as the delay in transferring the SR switch $SR_1$, $SR_2$ control signals across the isolation circuit 632. The primary-to-secondary transition delay may be determined during a characterization of the power converter 600.

The controller 640 monitors the current through the primary-side switches that are enabled, and compares this monitored current against the turn-off threshold for the current through the switches of interest. If the controller 640 detects that this current drops to or below the turn-off threshold, the controller 640 sends a signal to the appropriate (conducting) SR switch $SR_1$, $SR_2$, via isolation circuit 632, commanding that SR switch to turn off. Provided that the sensed primary-side current, the determined slope of the primary-side current, and the primary-to-secondary transition delay are reasonably accurate, the SR switch should be turned off when the current flowing through it is substantially zero.

Method for Turning Off an SR Switch in a Power Converter

Figure 7:
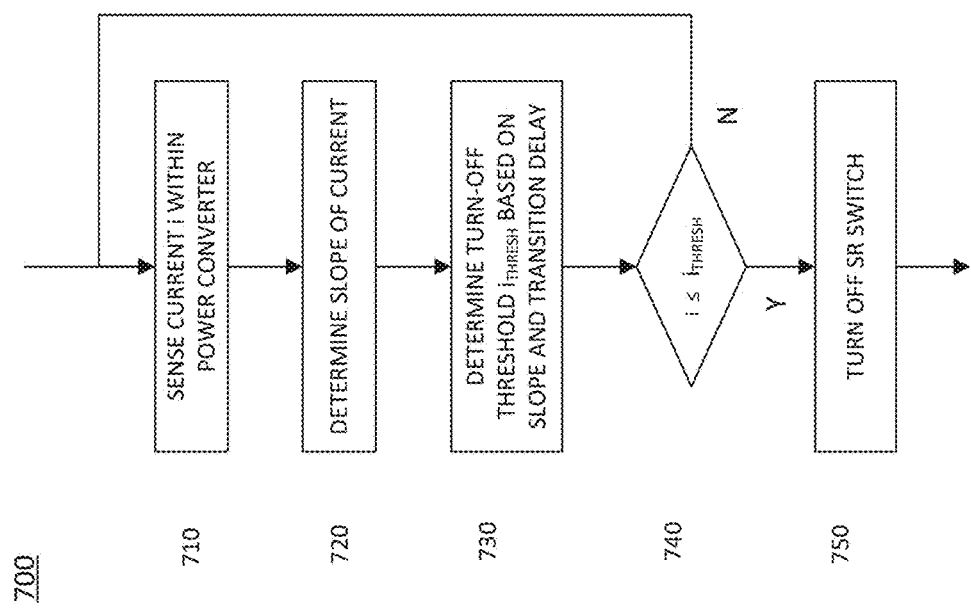
FIG. 7 illustrates a method within a power converter for turning off an SR switch.

FIG. 7 illustrates a method 700 for turning off an SR switch, such as one of the SR switches $SR_1$, $SR_2$ shown in FIG. 1. This method may be implemented, e.g., within a power converter such as that illustrated in FIG. 1. The techniques of this method 700 are similar to those described above regarding the power converter 100 of FIG. 1 and its variants.

In a first step 710, a current i within the power converter is sensed. This current typically corresponds to the current flowing through an SR switch of the power converter, e.g., the current $i_{rec}(t)$ in the power converter 100 of FIG. 1. However, the sensed current i may be sensed within some other line in the circuit, e.g., on the primary side of a power converter 600 as shown in FIG. 6. In a second step 720, a slope of this current i is determined. A turn-off threshold $i_{THRESH}$ is determined 730 based upon the slope of the current and a transition delay. As explained in conjunction with the power converter 100 of FIG. 1, this transition delay accounts for a delay through an SR switch driver and a delay through the SR switch itself. The sensed current i is compared 740 against the threshold $i_{THRESH}$. Responsive to detecting that the sensed current i falls to a level that is at or below the threshold $i_{THRESH}$, the SR switch is turned off 750. Otherwise, the current is sensed 710 again and the other steps are repeated.

As used herein, the terms "having", "containing", "including", "comprising" and the like are open-ended terms that indicate the presence of stated elements or features, but do not preclude additional elements or features. The articles "a" "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter, comprising:
   a synchronous rectification (SR) switch for rectifying an output current;
   a switch driver for the SR switch;
   a memory that stores a transition delay of the SR switch, wherein the transition delay includes a delay through the switch driver and a transition time for turning off the SR switch; and
   a controller operable to:
      sense a current of the power converter;
      determine a slope of the current;
      determine a turn-off threshold based upon the determined slope of the current and the transition delay stored in the memory;
      determine whether the sensed current has decreased to a level that is at or below the turn-off threshold; and
      turn off the SR switch responsive to determining that the sensed current has decreased to the level that is at or below the threshold.

2. The power converter of claim 1, wherein the controller is further operable to determine the slope of the current by:
   determining a first current value at a first time instant;
   determining a second current value at a second time instant that is later than the first time instant; and
   calculating the slope of the current based upon the first current value, the second current value, and the difference between the first time instant and second time instant.

3. The power converter of claim 1, wherein the controller is further operable to determine the turn-off threshold by using a look-up table.

4. The power converter of claim 1, wherein the transition delay is determined during a characterization of the SR switch and the switch driver.

5. The power converter of claim 1, further comprising:
   an analog to digital converter (ADC) for converting an analog representation of the sensed current into digital values that are provided to the controller,
   wherein the controller is further operable to determine the slope of the current based on the provided digital values.

6. The power converter of claim 1, further comprising:
   an analog differentiator operable to generate an analog slope signal corresponding to the slope of the current,
   wherein the controller is further operable to determine the slope of the current based upon the analog slope signal.

7. The power converter of claim 1, wherein the controller and the SR switch are integrated within a smart SR switch package that is separate from a main controller of the power converter.

8. The power converter of claim 1, wherein the sensed current is a current through the SR switch.

9. The power converter of claim 1, further comprising at least one of the following:
   a sense resistor connected in series with the SR switch, and wherein the controller is further operable to sense the current based upon a voltage across the sense resistor;
   an input terminal and an output terminal of the SR switch, and wherein the controller is further operable to sense the current based upon a voltage measured across the input terminal and the output terminal; and
   a current mirror that is part of or that is coupled to the SR switch, and wherein the controller is further operable to sense the current based upon a signal provided by the current mirror.

10. The power converter of claim 1, wherein the power converter is a resonant, half-wave rectified resonant, or semi-resonant power converter configured such that a waveform of the current flowing through the SR switch comprises sinusoidally-shaped half cycles.

11. The power converter of claim 1, further comprising:
    a transformer having a primary winding coupled to a power stage and a secondary winding coupled to the SR switch,
    wherein sensing the current of the power converter comprises sensing a current of the primary winding.

12. The power converter of claim 3, wherein using the look-up table comprises inputting a peak value corresponding to a peak of the sensed current or inputting an average value corresponding to an average of the sensed current or both, and providing the turn-off threshold based further upon at least one of the peak value and the average value.

13. A method comprising:
    sensing a current of a power converter;
    determining a slope of the current;
    retrieving, from a memory, a transition delay of a synchronous rectification (SR) switch of the power converter, wherein the transition delay includes a delay through a switch driver of the SR switch and a transition time for turning off the SR switch;
    determining a turn-off threshold based upon the determined slope of the current and the transition delay;
    determining whether the sensed current has decreased to a level that is at or below the turn-off threshold; and
    turning off the SR switch responsive to determining that the sensed current has decreased to the level that is at or below the turn-off threshold.

14. The method of claim 13, wherein determining the slope of the current comprises:
    determining a first current value at a first time instant;
    determining a second current value at a second time instant that is later than the first time instant; and
    calculating the slope of the current based upon the first current value, the second current value, and the difference between the first time instant and second time instant.

15. The method of claim 13, wherein determining the turn-off threshold further comprises using a look-up table.

16. The method of claim 13, wherein the transition delay is determined during a characterization of the SR switch and the switch driver.

17. The method of claim 13, wherein determining the slope of the current comprises digitally determining the slope of the current.

18. The method of claim 13, wherein determining the slope of the current comprises using an analog differentiator circuit, or determining whether the sensed current has decreased to the level comprises using an analog comparator circuit, or both.

19. The method of claim 13, wherein the sensed current of the power converter is a current of the SR switch.

20. The method of claim 13, wherein the power converter includes a transformer having a primary winding, and wherein sensing the current of the power converter comprises sensing a current of the primary winding of the transformer.

21. The method of claim 15, wherein using the look-up table comprises inputting a peak value corresponding to a peak of the sensed current or inputting an average value corresponding to an average of the sensed current or both, and providing the turn-off threshold based further upon at least one of the peak value and the average value.

22. The method of claim 19, wherein sensing the current of the power converter comprises at least one of the following:

measuring a sense voltage across a sense resistor that is connected in series with the SR switch;

measuring a switch voltage across an input terminal and an output terminal of the SR switch; and sensing a voltage signal or a current signal that is provided by a current mirror, wherein the current mirror is part of or is coupled to the SR switch.

* * * * *